United States Patent [19]
Huber et al.

[11] 4,162,478
[45] Jul. 24, 1979

[54] CIRCUIT ARRANGEMENT FOR TESTING OPERATING AND/OR CAPACITY CONDITIONS IN AUTOMOTIVE VEHICLES

[75] Inventors: Manfred Huber, München; Karl Kapfhammer, Germering; Erwin Schweiger, Dachau; Franz Jochmann, München; Alfred Krappel, Ismaning, all of Fed. Rep. of Germany

[73] Assignee: Bayerische Motoren Werke AG, Fed. Rep. of Germany

[21] Appl. No.: 740,941

[22] Filed: Nov. 11, 1976

[30] Foreign Application Priority Data

Nov. 11, 1975 [DE] Fed. Rep. of Germany ....... 2550570

[51] Int. Cl.² ............................................. G01R 31/02
[52] U.S. Cl. ................................. 340/52 F; 340/514; 340/517; 324/51; 324/133
[58] Field of Search .................. 340/52 F, 52 R, 412, 340/411, 413, 414, 415, 214, 514, 517; 307/10 R; 324/51, 133

[56]   References Cited
   U.S. PATENT DOCUMENTS

| 3,566,401 | 2/1971 | Smith et al. | 340/411 |
| 4,013,947 | 3/1977 | Arai | 340/52 F X |
| 4,045,794 | 8/1977 | Ohta | 340/52 F |

Primary Examiner—Alvin H. Waring
Attorney, Agent, or Firm—Craig and Antonelli

[57] ABSTRACT

In order to test at least one of the operating and capacitating conditions of an automotive vehicle, plural parallel circuits are included in a test circuit associated with sensors for each condition to be tested. These parallel circuits contain at least one pilot lamp and at least one switching unit. The switching unit may have simple switch contacts or may contain an electronic switching element. During normal operating conditions, the switching units are closed to provide a conductive path therethrough. During non-normal operating conditions and/or capacity conditions, the switching units open. For testing any condition, an individual test switch, which energizes each pilot lamp in the plural parallel circuits, is connected in series with the switching contacts and/or the conductive electronic switching elements of the switch units and with the pilot lamps in the plural circuits.

20 Claims, 1 Drawing Figure

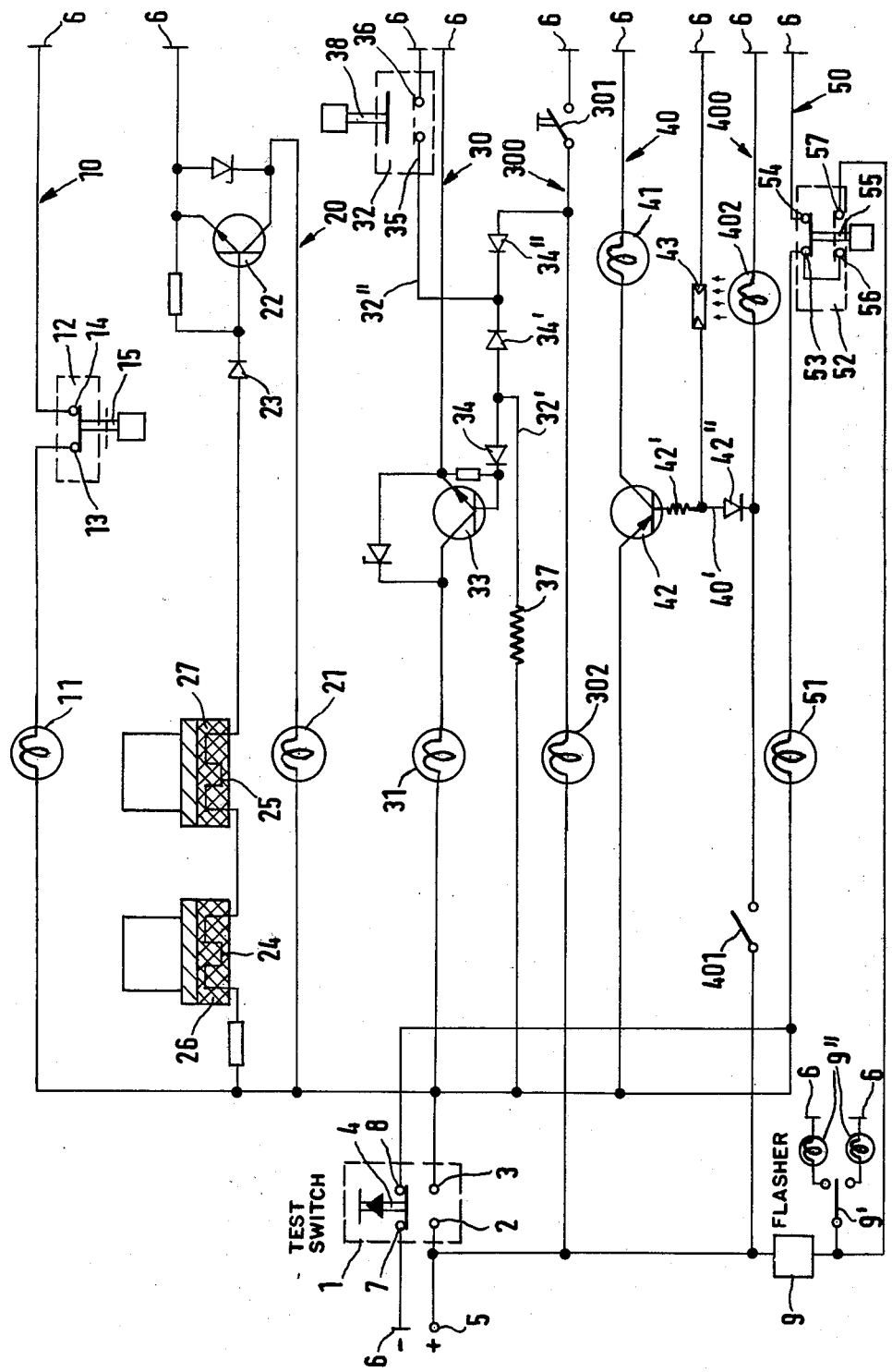

CIRCUIT ARRANGEMENT FOR TESTING OPERATING AND/OR CAPACITY CONDITIONS IN AUTOMOTIVE VEHICLES

BACKGROUND OF THE INVENTION

1. Field of the Invention

The present invention relates to a circuit arrangement for testing operating and/or capacity conditions in automotive vehicles.

2. Description of the Prior Art

In a conventional circuit arrangement of this type (as described in German Unexamined Laid-Open Application No. 1,942,021), one pilot lamp and one switching unit are respectively connected in series within several parallel circuits. The switching contacts of the switching units are open during normal operating situations; in case of abnormal operating conditions, these contacts are closed by operating condition pickup elements and cause the associated pilot lamps to light up. Furthermore, all of the pilot lamps are components of separate testing circuits wherein they are connected in series with a single test switch common to all of them and are actuatable for checking their function by activating the test switch. This known circuit arrangement has the disadvantage that it is impossible to test, with the use thereof, operating conditions and the associated circuits including the switching units and pilot lamps with respect to their capability to function.

SUMMARY OF THE INVENTION

It is an object of the present invention to provide a simple circuit arrangement, making it possible by the arbitrary operation of a test switch to monitor several operating and/or capacity conditions and the entire associated circuits, together with the switching units and pilot lamps.

This object has been attained by providing switching contacts and/or conductive switching elements and pilot lamps connected in series with the test switch, resulting in their cooperation in a multiple AND circuit, in a surprisingly simple manner. Upon the activation of the test switch, the pilot lamps light up and these indicate that the system is intact, if they are intact themselves and if the associated operating and/or capacity conditions are normal, and the switching contacts of the switching units are closed and all lines and contact points of the circuits are free from faults. If a pilot lamp does not light up, there is a deficiency in the condition to be monitored or a defect in the associated circuit.

According to one feature of the invention there is a particularly simple construction with a respectively simple conductive connection to the individual switching units.

A further feature of the invention is a circuit for monitoring the thickness of the lining of automobile brakes. Pickup elements controlling the base of a transistor, constituting conductor sections in the normal condition, are arranged in brake linings and become conductive or are interrupted at a specific degree of wear toward the ground pole, whereby, with the aid of the provided circuit arrangement, the testing function is accomplished in both cases.

An additional characteristic feature of the invention is a circuit, by means of which the perfect functioning of a current load conductive in the normal condition, for example an incandescent lamp, is being monitored.

The present invention also provides electronic reversing circuits in case an automatic defect indicator lamp is additionally controlled with the pilot lamp of the invention actuated by means of the test switch, by means of a common pickup element which is nonconductive during normal operating conditions and/or the switching contacts of which are open.

As another feature of the invention there is, in addition to the testing step with the aid of the test switch, an automatically operating permanent monitoring procedure and defect indication with the same switching units. An advantageous embodiment of the permanent monitoring system has the pilot lamps, upon the indication of a defect, supplied by a flasher unit, in order to differentiate the indication that the system is intact from the indication that the system is defective by means of a different light signal.

Additional advantages of the invention, and features constituting further embodiments of the invention, can be seen from the following description of a circuit arrangement illustrated by way of example in the drawing for the testing of operating and/or filling conditions in automotive vehicles.

BRIEF DESCRIPTION OF THE DRAWING

The single FIGURE is a schematic circuit diagram of the invention.

DETAILED DESCRIPTION OF THE INVENTION

By way of a test switch 1, the switching contacts 2 and 3 of which can be closed by activating a push button 4, parallel-connected circuits 10, 20, 30, 40 and 50, serving for monitoring operating and/or capacity conditions in automobiles are connected, on the one hand, together to the switchable pole 5 of the vehicle power supply and, on the other hand, to the ground pole 6. The circuits comprise in a series connection respectively one of the pilot lamps 11, 21, 31, 41 or 51 and one of the switching units 12, 22, 32, 42 or 52. In the rest position, the push button 4 contacts break contacts 7 and 8. A directional flasher unit 9 is inserted in the circuit 50 and/or in the connection of the latter to the switchable pole 5; by way of a direction indicator switch 9', the flasher lamps 9" for indicating the driving direction are connected to this flasher unit 9.

A level switch 12, the switching contacts of which, denoted by 13 and 14, are closed by a level pickup element 15 in the normal capacity condition, serves in the circuit 10 for monitoring the capacity condition of a radiator or washer liquid tank and thus acts as the switching unit. If the filling level decreases, the level pickup element 15 interrupts the circuit 10 so that the pilot lamp 11 does not light up when the test switch 1 is activated.

The circuit 20 serves for monitoring the thickness of the lining of the vehicle brakes. The switching unit consists of an n-p-n transistor 22, the collector of which is connected via the pilot lamp 21 with the switching contact 3 of the test switch 1, and the emitter of which is connected to the ground pole 6. The base of the transistor 22 is connected to the test switch 1 via a diode 23 and pickup elements 24 and 25. Wire loops arranged in brake linings 26 and 27 are utilized as the pickup elements 24 and 25. In case of normal brake linings 26 and 27, or brake linings which still exhibit a sufficient thickness, the wire loops are conductive; the current flowing through the wire loops when the test switch 1 is closed controls the base of transistor 22, renders the latter conductive, and causes the pilot lamp 21 to light up. Starting with a certain minimum thickness of the brake linings 26 and 27, the wire loops are severed by abrasion and thus interrupted, so that the base of the transistor 22 does not receive any current when the test switch 1 is activated, and the pilot lamp 21 does not light up.

The circuit 30 serves for monitoring the brake fluid level, The switching unit for an associated pilot lamp 31 is constituted by a level switch 32 and an n-p-n transistor 33, the base of which is connected to the test switch 1 via a lead 32', the diode 34, as well as a resistor 37, while the emitter-collector path is connected to the test switch 1 via the pilot lamp 31. Switching contacts 35 and 36 of a level switch 32 are connected to the lead 32' to the diode 34 via a connecting line 32" and a further diode 34'; these switching contacts are open during a normal capacity condition and are closed by a level pickup means 38 when the level falls to an abnormal degree. The connecting line 32" from the diode 34' to the switching contact 35 is connected via a third diode 34" to a circuit 300 which contains in a series connection a hand-brake switch 301, activated by a hand-brake lever and a brake pilot lamp 302, connected directly to the switchable pole 5. The connecting line 32" to the switching contact 35 of the level switch 32 is connected to the circuit 300 between the brake pilot lamp 302 and the hand-brake switch 301.

The circuts 30 and 300, constructed and connected with each other as described above, make it possible, on the one hand, to control the brake fluid level and the associated circuit 30 by activating the test switch 1 at will and, on the other hand, provide a permanent monitoring of the brake fluid level with defect indication. By operating the test switch 1, the base of transistor 33 is controlled, when the brake fluid level is normal, via the diode 34 and the resistor 37, by the positive pole; the transistor 33 becomes conductive and the pilot lamp 31 lights up. When the level has dropped to an abnormal degree, the level pickup means 38 closes the switching contacts 35 and 36 of the level switch 32 and thus connects the base of transistor 33 to ground; the latter blocks the circuit 30, and the pilot lamp 31 is not supplied with current. The brake pilot lamp 302 lights up when the hand brake switch 301 and/or the level switch 32 are closed. This lamp serves, when the hand brake switch 301 is open, for the permanent monitoring of the brake fluid level.

An incandescent lamp circuit 400 is monitored by means of the circuit 40 and the pilot lamp 41, disposed therein. This incandescent lamp circuit contains—in a series connection—a light switch 401, connected to the switchable pole 5 and an incandescent lamp 402, connected to the ground pole 6. A connecting line 40', with a resistor 42' and a diode 42", branches off to the base of a p-n-p transistor 42 between the light switch 401 and the incandescent lamp 402. The collector-emitter path of the transistor 42 is connected in series with the pilot lamp 41, on the one hand, to the test switch 1 and, on the other hand, to the ground pole 6. Between the resistor 42' and the diode 42", a photoconductive cell 43, associated with the incandescent lamp 402, is connected, the other end of this cell being connected to the ground pole 6.

When the light switch 401 is open and the test switch 1 is closed, current flows via the emitter and the base of transistor 42 as well as via the intact incandescent lamp 402 to the ground pole 6. The transistor 42 becomes conductive, and the pilot lamp 41 lights up. When the light switch 401 is closed and the incandescent lamp 402 lights up, the transistor 42 is controlled by the photoconductive cell 43, and the pilot lamp 41 lights up likewise. If the incandescent lamp 402 is defective, or if there is a defect in its circuit 400, however, the pilot lamp 41 does not light up.

The circuit 50, intended for the pilot lamp 51 for monitoring the coolant level, differs from circuit 10 merely in that the level switch 52, used as the switching unit, is provided in addition to switching contacts 53 and 54, closed by means of a level pickup element 55 when the level is normal, also with switching contacts 56 and 57 which are closed by the level pickup element 55 in case of a lowered, abnormal filling condition (position shown in dashed lines). The switching contact 53 is connected to contact 56; the contact 57 is connected to the switchable pole 5 via the flasher unit 9.

When the test switch 1 is operated, the same function is obtained with the aid of circuit 50 as in case of circuit 10. If the test switch 1 is opened, but its break contacts 7 and 8 are closed and the contacts 56 and 57 of the level switch 52 are closed by the level pickup element 55, current flows from the switchable pole via the flasher unit 9, the level switch 52, the pilot lamp 51, and the break contacts 7 and 8 of the test switch 1 to the ground pole 6. The pilot lamp 51, thus, has current flowing therethrough in the reverse direction from that when the test switch 1 is activated. The pilot lamp 51 yields, as an indication of the defect, a well-differentiated blinking light controlled by the flahser unit 9.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. A circuit for testing operating and capacity conditions of an automotive vehicle comprising plural parallel circuits each containing at least one pilot lamp and switching means operable in accordance with an operating or capacity condition, and a single test switch to simultaneously energize said pilot lamps independently of vehicle operation, wherein each of said switching means is connected in series with at least one pilot lamp and with said single test switch, and wherein each of said switching means is electrically conductive during normal operating and capacity conditions.

2. A circuit according to claim 1, wherein said switching means includes switching contacts.

3. A circuit according to claim 2, wherein said switching means further include transistor switching elements.

4. A circuit according to claim 3, wherein said transistor switching elements comprise at least one n-p-n transistor, the collector-emitter path of which is connected in series with a pilot lamp and switching contacts of said test switch, and the base of which is connected via at least one pickup element forming a conductor section in the normal condition to a switching contact of said test switch.

5. A circuit according to claim 1, wherein said single test switch is a single-pole switch, and said switching means connect a conductive line of said parallel circuits to a ground pole of the vehicle power supply, while said parallel circuits are further connected to a switching contact of said single-pole test switch, a second switching contact of said test switch being connected to a switchable pole of the vehicle power supply.

6. A circuit according to claim 5, wherein said switching means include an n-p-n transistor, the collector-emitter path of which is connected in series with a pilot lamp and switching contacts of said test switch, and the base of which is connected via at least one pickup element forming a conductor section in the normal condition to a switching contact of said test switch.

7. A circuit according to claim 5, wherein said switching means include a p-n-p transistor, the collector-emitter path of which is connected in series with a pilot lamp and switching contacts of said test switch, and the base of which is connected to a connecting line from a pole of the vehicle power supply to a current load and/or to a switching element placed in conductive condition by the current load in operation by the light and/or heat radiation thereof, said switching element being connected with its other terminal to the other pole of the vehicle power supply.

8. A circuit according to claim 5, wherein said switching means include a transistor switching element, conductive during normal operating and/or capacity conditions, and controlled by an operating and/or capacity condition pickup element, the circuit of which is open in the normal condition.

9. A circuit according to claim 8, comprising an n-p-n transistor, the collector-emitter path of which is connected in series with a pilot lamp and switching contacts of said test switch, and the base of which is connected, on the one hand, to the switching contacts of said test switch and, on the other hand, via switching contacts closed in case of abnormal operating and/or capacity conditions and pertaining to a pickup element, to a pole of the vehicle power supply, and wherein a resistor is connected between the test switch and said pole.

10. A circuit according to claim 1, wherein said switching means include a p-n-p transistor, the collector-emitter path of which is connected in series with a pilot lamp and switching contacts of said test switch, and the base of which is connected to a connecting line from a pole of the vehicle power supply to a current load and/or to a switching element placed in conductive condition by the current load in operation by the light and/or heat radiation thereof, said switching element being connected with its other terminal to the other pole of the vehicle power supply.

11. A circuit according to claim 1, wherein said switching means include a transistor switching element, conductive during normal operating and/or capacity conditions, and controlled by an operating and/or capacity condition pickup element, the circuit of which is open in the normal condition.

12. A circuit according to claim 11, comprising an n-p-n transistor, the collector-emitter path of which is connected in series with a pilot lamp and switching contacts of said test switch, and the base of which is connected, on the one hand, to the switching contacts of said test switch and, on the other hand, via switch contacts closed in case of abnormal operating and/or capacity conditions and pertaining to a pickup element, to a pole of the vehicle power supply, and wherein a resistor is connected between the test switch and said pole.

13. A circuit arrangement according to claim 12, wherein a flasher unit is interposed in the connection to one of the poles of the vehicle power supply, said pilot lamp being connected in parallel to directional blinker lamps.

14. A circuit according to claim 1, wherein a circuit including said switching means for a pilot lamp associated with an operating and/or capacity condition essential to the operation of the automotive vehicle is connected to one pole of the vehicle power supply in case of an abnormal condition by way of switching contacts of said switching means, said circuit being connected, in the rest position of said test switch, to the other pole of the vehicle power supply by way of break contacts of said test switch and/or by way of transistor switching elements controlled by said test switch.

15. A circuit according to claim 1, wherein said switching means include transistor switching elements.

16. In a circuit for testing operating and capacity conditions of an automotive vehicle of the type comprising plural parallel circuits, each including a pilot lamp and sensing means for sensing an operating or capacity condition, the improvement comprising means including a single test switch to simultaneously energize said pilot lamps independently of vehicle operation for testing failure of said pilot lamp and said sensing means, as well as testing said operating or capacity condition.

17. A circuit according to claim 16, wherein said pilot lamp of each parallel circuit and said single test switch are connected in series.

18. A circuit according to claim 16, wherein switching means are associated with said sensing means to maintain each said parallel circuit in conductive state during normal operating or capacity conditions, said switching means being connected in series with said pilot lamp and said single test switch.

19. A circuit according to claim 16, wherein said switching means include switching contacts and transistor switches.

20. A circuit according to claim 16, wherein said sensing means include level pickup elements, conductive loops, and light and/or heat detector elements.

* * * * *